United States Patent
He et al.

(10) Patent No.: US 10,440,701 B2
(45) Date of Patent: Oct. 8, 2019

(54) USER EQUIPMENT AND POWER ALLOCATION METHOD

(71) Applicant: Huawei Technologies Co., Ltd., Shenzhen (CN)

(72) Inventors: Chuanfeng He, Beijing (CN); Bingyu Qu, Beijing (CN); Zhiyu Yan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 73 days.

(21) Appl. No.: 15/391,618

(22) Filed: Dec. 27, 2016

(65) Prior Publication Data

US 2017/0111891 A1    Apr. 20, 2017

Related U.S. Application Data

(63) Continuation of application No. PCT/CN2014/081604, filed on Jul. 3, 2014.

(51) Int. Cl.
*H04W 72/04* (2009.01)
*H04W 52/14* (2009.01)
(Continued)

(52) U.S. Cl.
CPC ........ *H04W 72/042* (2013.01); *H04L 5/001* (2013.01); *H04W 52/14* (2013.01);
(Continued)

(58) Field of Classification Search
None
See application file for complete search history.

(56) References Cited

U.S. PATENT DOCUMENTS

| 9,480,023 B2 | 10/2016 | Gao et al. |
| 2013/0196707 A1 | 8/2013 | Baldemair et al. |

(Continued)

FOREIGN PATENT DOCUMENTS

| AL | 3099118 A1 | 11/2016 |
| CN | 102238716 A | 11/2011 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, V12.2.0, pp. 1-207, 3rd Generation Partnership Project, Valbonne, France (Jun. 2014).

(Continued)

*Primary Examiner* — Kouroush Mohebbi
(74) *Attorney, Agent, or Firm* — Leydig, Voit & Mayer, Ltd.

(57) ABSTRACT

A terminal device and a power allocation method are disclosed, relates to the field of communications network technologies. In embodiments of the present disclosure, at least one uplink channel of a first target subframe numbered i is determined; according to uplink channel information of a second target subframe numbered x, a reserved power that is reserved for a base station or a cell group in which the second target subframe numbered x is located is determined, where the reserved power is determined when uplink channel information of the second target subframe numbered x includes a PRACH or includes only an SRS channel or includes no channel. According to the reserved power, a transmit power of each uplink channel in the at least one uplink channel of the first target subframe numbered i is determined. Solutions provided in the embodiments of the present disclosure are applicable to power allocation.

20 Claims, 7 Drawing Sheets

(51) Int. Cl.
*H04W 52/32* (2009.01)
*H04W 52/36* (2009.01)
*H04W 74/08* (2009.01)
*H04L 5/00* (2006.01)
*H04W 52/16* (2009.01)
*H04W 52/50* (2009.01)
*H04W 76/15* (2018.01)
*H04W 52/28* (2009.01)
*H04W 52/34* (2009.01)

(52) U.S. Cl.
CPC ......... *H04W 52/146* (2013.01); *H04W 52/16* (2013.01); *H04W 52/325* (2013.01); *H04W 52/367* (2013.01); *H04W 52/50* (2013.01); *H04W 72/0446* (2013.01); *H04W 72/0473* (2013.01); *H04W 74/0833* (2013.01); *H04W 76/15* (2018.02); *H04W 52/281* (2013.01); *H04W 52/34* (2013.01)

(56) References Cited

U.S. PATENT DOCUMENTS

| | | | | |
|---|---|---|---|---|
| 2013/0272229 | A1* | 10/2013 | Dinan | H04W 52/18 370/329 |
| 2013/0272232 | A1* | 10/2013 | Dinan | H04W 52/386 370/329 |
| 2014/0329555 | A1 | 11/2014 | Gao et al. | |
| 2015/0351052 | A1 | 12/2015 | Jeong et al. | |
| 2016/0330693 | A1 | 11/2016 | Hwang et al. | |

FOREIGN PATENT DOCUMENTS

| | | |
|---|---|---|
| CN | 102378341 A | 3/2012 |
| CN | 102573030 A | 7/2012 |
| CN | 102711235 A | 10/2012 |
| CN | 103124428 A | 5/2013 |
| JP | 2014504114 A | 2/2014 |
| JP | 2014535245 A | 12/2014 |
| JP | 2015500593 A | 1/2015 |
| JP | 2017504270 A | 2/2017 |
| WO | 2013067430 A1 | 5/2013 |
| WO | 2013071778 A1 | 5/2013 |
| WO | 2013082962 A1 | 6/2013 |
| WO | 2015111915 A1 | 7/2015 |

OTHER PUBLICATIONS

"Discussion on random access in dual connectivity," 3GPP TSG RAN WG1 Meeting #76, Prague, Czech Republic, R1-140294, 3$^{rd}$ Generation Partnership Project, Valbonne, France (Feb. 10-14, 2014).

"Channel prioritisation and power scaling for dual connectivity," 3GPP TSG RAN WG1 Meeting #77, Seoul, Korea, R1-142170, 3$^{rd}$ Generation Partnership Project, Valbonne, France (May 19-23, 2014).

\* cited by examiner

901 — Determine at least one uplink channel of a first target subframe numbered i, where i is a subframe number in 0~9

902 — UE determines, according to uplink channel information of a second target subframe numbered x, a reserved power that is reserved for a base station or a cell group in which the second target subframe numbered x is located, where the reserved power is determined when an uplink channel of the second target subframe numbered x includes a physical random access channel PRACH indicated by a physical downlink control channel order PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9; or the reserved power is determined when an uplink channel of the second target subframe numbered x includes a PRACH determined by using a physical downlink channel of a subframe numbered x−n; or the reserved power is determined when there is no PDCCH used to indicate another channel, except a sounding reference signal SRS channel, of an uplink channel of the second target subframe numbered x, and the second target subframe numbered x has no uplink channel or has only the SRS channel 903 — Determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the user equipment UE

FIG. 9

USER EQUIPMENT AND POWER ALLOCATION METHOD

CROSS-REFERENCE TO RELATED APPLICATIONS

This application is a continuation of International Application No. PCT/CN2014/081604, filed on Jul. 3, 2014, the disclosure of which is hereby incorporated by reference in its entirety.

TECHNICAL FIELD

The present disclosure relates to the field of communications technologies, and in particular, to user equipment and a power allocation method.

BACKGROUND

To provide a higher transmission bandwidth, a CA (carrier aggregation) technology is put forward in the prior art. The CA technology is a technology of aggregating spectrums of at least two carriers. In the CA technology, spectrums of component carriers may be contiguous continuous spectrums, or may be noncontiguous spectrums in a same band or even discontinuous spectrums in different bands. By using the CA technology, a UE (user equipment) in an LTE-A (Long Term Evolution-Advanced) system can use multiple component carriers simultaneously according to its capability and service requirement to transmit or receive data.

In a technology in which carriers of multiple base stations are used to perform aggregation (for example, one UE may be connected to two base stations), when transmission times of downlink channels (downlink transmission time, for short) of two base stations are not synchronous, as shown in FIG. 1, downlink transmission times of cells Cell 1 and Cell 2 are not synchronous, which makes uplink transmission times of the Cell 1 and the Cell 2 be not synchronous; consequently, a subframe i (a subframe numbered i) corresponding to an uplink channel of the Cell 1 overlaps a subframe j (a subframe numbered j) and a subframe j+1 (a subframe numbered j+1) that are corresponding to an uplink channel of the Cell 2, where the Cell 1 and the Cell 2 belong to different base stations. A transmission start moment of the subframe j is earlier than a transmission start moment of the subframe i, and a transmission start moment of the subframe j+1 is later than the transmission start moment of the subframe i, where i, j, and j+1 are subframe numbers. When i, j, or j+1 is out of a range 0~9, the subframe number is i mod 10, j mod 10, or (j+1)mod 10. When the UE decides a channel power of a subframe (assumed as the subframe i), it needs to consider power allocation of uplink channels of two subframes (assumed as the subframe j and the subframe j+1) of a cell covered by another base station, where the two subframes overlap the subframe i. That is, it is ensured that a sum of transmit powers of multiple channels in any time segment cannot exceed a maximum transmit power of the UE in the time segment. Before a downlink subframe i−4 ends, the UE has learned uplink channel information of the subframe i and the subframe j, but still cannot learn uplink channel information of the subframe j+1. Generally, a subframe i+n represents an $n^{th}$ subframe following the subframe i, where n is a positive integer; and a subframe i−n represents an $n^{th}$ subframe previous to the subframe where n is a positive integer. When the UE does not support reduction of processing time for deciding a transmit power of an uplink channel of the subframe i (that is, time for waiting for learning an uplink channel of the subframe j+1 cannot be subtracted), unless absence of an uplink channel on the subframe j+1 is learned according to semi-statically configured information, that is, transmission of an uplink channel is possible, the UE reserves a guaranteed power for a base station or a cell group in which the subframe j+1 is located, so as to decide the transmit power of the uplink channel, which is to be allocated to the subframe i. The guaranteed power is a semi-static power value, and the semi-static power value is a power configured by using higher layer signaling such as RRC (Radio Resource Control) signaling. Generally, one guaranteed power is available for each base station or cell group.

In the prior art, a guaranteed power is preset for the base station or the cell group in which the subframe j+1 is located, without considering actual transmit power allocation of the uplink channel of the subframe j+1; then the transmit power, which is to be allocated to the subframe i, of the corresponding uplink channel is decided according to the guaranteed power. However, when the guaranteed power is less than a transmit power, which is actually required by the subframe j+1, of the uplink channel, receiving performance of an uplink channel of the UE in a base station of a cell in which the UE is located is affected, where the uplink channel is an uplink channel in which the subframe j+1 is located. When the guaranteed power is greater than a transmit power, which is actually required by the subframe j+1, of the uplink channel, and consequently, the transmit power, which is allocated to the subframe i, of the uplink channel is less than an actual transmit power of the uplink channel of the subframe i, receiving performance of an uplink channel of the UE in a base station of a cell in which the UE is located is affected, where the uplink channel is an uplink channel in which the subframe i is located. That is, when the reserved transmit power (guaranteed power) of the uplink channel is improper, the receiving performance of the uplink channel of the UE in the base station of the cell in which the UE is located is affected.

SUMMARY

Embodiments of the present disclosure provide user equipment and a power allocation method, to resolve a problem about how to properly allocate a transmit power of an uplink channel.

According to a first aspect, an embodiment of the present disclosure provides user equipment UE, including:

a determining module, configured to determine at least one uplink channel of a first target subframe numbered i, where i is a subframe number in 0~9, where the determining module is further configured to determine, according to uplink channel information of a second target subframe numbered x, a reserved power that is reserved for a base station or a cell group in which the second target subframe numbered x is located, where the reserved power is determined when an uplink channel of the second target subframe numbered x includes a physical random access channel PRACH indicated by a physical downlink control channel order PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9; or the reserved power is determined when an uplink channel of the second target subframe numbered x includes a PRACH determined by using a physical downlink channel of a subframe numbered x-n, where n is an integer greater than or equal to 5; or the reserved power is determined when there is no PDCCH used to indicate another channel, except a sounding reference signal SRS channel, of an uplink channel of the second target subframe numbered x, and the second target subframe numbered x has no uplink channel or has only the SRS channel; and a calculating module, configured to determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

With reference to the first aspect, in a first possible embodiment, the calculating module is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

With reference to the first aspect or the first possible embodiment of the first aspect, in a second possible embodiment, the user equipment UE further includes a sending module, where the sending module is configured to send, according to the transmit power, a signal on the at least one uplink channel of the first target subframe numbered i.

With reference to the first aspect or either of the foregoing possible embodiments of the first aspect, in a third possible embodiment, the user equipment UE further includes a receiving module and a detecting module, where the receiving module is configured to receive the PDCCH order; receive the physical downlink channel of the subframe numbered x-n; receive the PDCCH; and provide the detecting module with the PDCCH order, the physical downlink channel of the subframe numbered x-n, and the PDCCH;

the detecting module is configured to detect the PDCCH order; detect the physical downlink channel of the subframe numbered x-n; detect the PDCCH; and provide the determining module with a detection result; and the determining module is further configured to: according to the detection result, determine that the uplink channel information, which is carried in the PDCCH order, of the second target subframe numbered x includes the physical random access channel PRACH; or according to the detection result, determine that the uplink channel information, which is carried in the physical downlink channel of the subframe numbered x-n, of the second target subframe numbered x includes the PRACH; or according to the detection result, determine that the uplink channel information, which is carried in the PDCCH, of the second target subframe numbered x includes only the sounding reference signal SRS channel or includes no channel.

With reference to the first aspect or any one of the foregoing possible embodiments of the first aspect, in a fourth possible embodiment, the determining module is specifically configured to determine the reserved power according to a PRACH predefined transmit power and a guaranteed power when the uplink channel of the second target subframe numbered x includes the PRACH, where the PRACH predefined transmit power is a transmit power predefined for the PRACH, and the guaranteed power is a guaranteed power configured, by using higher layer signaling, for the base station or the cell group in which the second target subframe numbered x is located.

With reference to the first aspect or any one of the first three possible embodiments of the first aspect, in a fifth possible embodiment, the user equipment UE further includes a judging module, where the judging module is configured to: when the uplink channel of the second target subframe numbered x includes the PRACH, determine a priority of the PRACH and priorities of all the uplink channels of the first target subframe numbered i; and the determining module is further configured to determine the reserved power according to the PRACH predefined transmit power and the guaranteed power when the priority of the PRACH is higher than the priorities of all the uplink channels of the first target subframe numbered i.

With reference to the fourth or fifth possible embodiment of the first aspect, in a sixth possible embodiment, the determining module is specifically configured to determine that a value of the reserved power is greater than or equal to max{the guaranteed power, the PRACH predefined transmit power}, where max means taking a maximum value.

With reference to any one of the fourth to sixth possible embodiments of the first aspect, in a seventh possible embodiment, the PRACH predefined transmit power is
min{$P_{CMAX,c}(j)$, PREAMBLE_RECEIVED_TARGET_POWER+$PL_c$}, where $P_{CMAX,c}(j)$ is a maximum transmit power of a subframe numbered j of a cell c in which the PRACH of the second target subframe numbered x is located, the preamble received target power PREAMBLE_RECEIVED_TARGET_POWER is a power parameter configured by a higher layer, $PL_c$ is a measurement value of a path loss of the UE, j=x−1, the subframe numbered j is a subframe previous to the subframe numbered x, and when x−1 is out of a range 0~9, the number of the subframe numbered j is (x−1)mod 10, where mod is a modulo operator; or the PRACH predefined transmit power is
PREAMBLE_RECEIVED_TARGET_POWER+$PL_c$.

With reference to the first aspect or any one of the first three possible embodiments of the first aspect, in an eighth possible embodiment, the determining module is further configured to: when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, determine that the reserved power is 0.

According to a second aspect, an embodiment of the present disclosure provides user equipment UE, including:

a determining module, configured to determine at least one uplink channel of a first target subframe numbered i, where i is a subframe number in 0~9, where the determining module is further configured to: when uplink channel information of the first target subframe numbered i includes a physical random access channel PRACH with a highest power allocation priority, determine, according to the uplink channel information of the first target subframe numbered i, a reserved power that is reserved for a base station or a cell group in which a second target subframe numbered x is located, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10, where mod is a modulo operator; and the calculating module, further configured to determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the user equipment UE.

With reference to the second aspect, in a first possible embodiment, the calculating module is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

With reference to the second aspect or the first possible embodiment of the second aspect, in a second possible embodiment, the user equipment UE further includes a sending module, where the sending module is configured to send, according to the transmit power, a signal on the at least one uplink channel of the first target subframe numbered i.

With reference to the second aspect or either of the foregoing possible embodiments of the second aspect, in a third possible embodiment, the determining module is specifically configured to determine the reserved power according to a PRACH transmit power and a guaranteed power, where the PRACH transmit power is a transmit power of the PRACH of the first target subframe numbered i, the guaranteed power is a guaranteed power configured, by using higher layer signaling, for the base station or the cell group in which the second target subframe numbered x is located, and the reserved power is less than or equal to the guaranteed power and less than or equal to a difference between the maximum transmit power of the UE and the PRACH transmit power.

With reference to the third possible embodiment of the second aspect, in a fourth possible embodiment, the PRACH transmit power is
$\min\{P_{CMAX,c}(i), \text{PREAMBLE\_RECEIVED\_TARGET\_POWER}+PL_c\}$, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, and $PL_c$ is a measurement value of a path loss of the UE.

According to a third aspect, an embodiment of the present disclosure provides user equipment UE, including:

a memory, configured to store information that includes a program instruction; and a processor, coupled to the memory and configured to control execution of the program instruction, and specifically configured to: determine at least one uplink channel of a first target subframe numbered i, where i is a subframe number in 0~9; determine, according to uplink channel information of a second target subframe numbered x, a reserved power that is reserved for a base station or a cell group in which the second target subframe numbered x is located, where the reserved power is determined when an uplink channel of the second target subframe numbered x includes a physical random access channel PRACH indicated by a physical downlink control channel order PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or the reserved power is determined when an uplink channel of the second target subframe numbered x includes a PRACH determined by using a physical downlink channel of a subframe numbered x-n, where n is an integer greater than or equal to 5, or the reserved power is determined when there is no PDCCH used to indicate another channel, except a sounding reference signal SRS channel, of an uplink channel of the second target subframe numbered x, and the second target subframe numbered x has no uplink channel or has only the SRS channel; and determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

With reference to the third aspect, in a first possible embodiment, the processor is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

With reference to the third aspect or the first possible embodiment of the third aspect, in a second possible embodiment, the user equipment UE further includes a transceiver, where the transceiver is configured to send, according to the transmit power, a signal on the at least one uplink channel of the first target subframe numbered i.

With reference to the third aspect or either of the foregoing possible embodiments of the third aspect, in a third possible embodiment, the transceiver is further configured to receive the PDCCH order; receive the physical downlink channel of the subframe numbered x-n; receive the PDCCH; and provide the processor with the PDCCH order, the physical downlink channel of the subframe numbered x-n, and the PDCCH; and the processor is further configured to: by detecting the PDCCH order, determine that the uplink channel information of the second target subframe numbered x includes the physical random access channel PRACH; or by detecting the physical downlink channel of the subframe numbered x-n, determine that the uplink channel information of the second target subframe numbered x includes the PRACH; or by detecting the PDCCH, determine that the uplink channel information of the second target subframe numbered x includes only the sounding reference signal SRS channel or includes no channel.

With reference to the third aspect or any one of the foregoing possible embodiments of the third aspect, in a fourth possible embodiment, the processor is further configured to determine the reserved power according to a PRACH predefined transmit power and a guaranteed power when the uplink channel of the second target subframe numbered x includes the PRACH, where the PRACH predefined transmit power is a transmit power predefined for the PRACH, and the guaranteed power is a guaranteed power configured, by using higher layer signaling, for the base station or the cell group in which the second target subframe numbered x is located.

With reference to the third aspect or any one of the first three possible embodiments of the third aspect, in a fifth possible embodiment, the processor is further configured to: when the uplink channel of the second target subframe numbered x includes the PRACH, determine a priority of the PRACH and priorities of all the uplink channels of the first target subframe numbered i; and when the priority of the PRACH is higher than the priorities of all the uplink channels of the first target subframe numbered i, determine the reserved power according to the PRACH predefined transmit power and the guaranteed power.

With reference to the fourth or fifth possible embodiment of the third aspect, in a sixth possible embodiment, the processor is specifically configured to determine that a value of the reserved power is greater than or equal to max{the guaranteed power, the PRACH predefined transmit power}, where max means taking a maximum value.

With reference to any one of the fourth to sixth possible embodiments of the third aspect, in a seventh possible embodiment, the PRACH predefined transmit power is
min{$P_{CMAX,c}(j)$, PREAMBLE_RECEIVED_TARGET_POWER+$PL_c$}, where
$P_{CMAX,c}(j)$ is a maximum transmit power of a subframe numbered j of a cell c in which the PRACH of the second target subframe numbered x is located, the preamble received target power PREAMBLE_RECEIVED_TARGET_POWER is a power parameter configured by a higher layer, $PL_c$ is a measurement value of a path loss of the UE, j=x−1, the subframe numbered j is a subframe previous to the subframe numbered x, and when x−1 is out of a range 0~9, the number of the subframe numbered j is (x−1)mod 10, where mod is a modulo operator; or the PRACH predefined transmit power is
PREAMBLE_RECEIVED_TARGET_POWER+$PL_c$.

With reference to the third aspect or any one of the first three possible embodiments of the third aspect, in an eighth possible embodiment, the processor is further configured to: when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, determine that the reserved power is 0.

According to a fourth aspect, an embodiment of the present disclosure provides user equipment UE, including:

a memory, configured to store information that includes a program instruction; and a processor, coupled to the memory and configured to control execution of the program instruction, and specifically configured to: determine at least one uplink channel of a first target subframe numbered i, where i is a subframe number in 0~9; when uplink channel information of the first target subframe numbered i includes a physical random access channel PRACH with a highest power allocation priority, determine, according to the uplink channel information of the first target subframe numbered i, a reserved power that is reserved for a base station or a cell group in which a second target subframe numbered x is located, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10, where mod is a modulo operator; and determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

With reference to the fourth aspect, in a first possible embodiment, the processor is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

With reference to the fourth aspect or the first possible embodiment of the fourth aspect, in a second possible embodiment, the user equipment UE further includes a transceiver, where the transceiver is configured to send, according to the transmit power, a signal on the at least one uplink channel of the first target subframe numbered i.

With reference to the fourth aspect or either of the foregoing possible embodiments of the fourth aspect, in a third possible embodiment, the processor is further configured to determine the reserved power according to a PRACH transmit power and a guaranteed power, where the PRACH transmit power is a transmit power of the PRACH of the first target subframe numbered i, the guaranteed power is a guaranteed power configured, by using higher layer signaling, for the base station or the cell group in which the second target subframe numbered x is located, and the reserved power is less than or equal to the guaranteed power and less than or equal to a difference between the maximum transmit power of the UE and the PRACH transmit power.

With reference to the third possible embodiment of the fourth aspect, in a fourth possible embodiment, the PRACH transmit power is
min{$P_{CMAX,c}(i)$, PREAMBLE_RECEIVED_TARGET_POWER+$PL_c$}, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, and $PL_c$ is a measurement value of a path loss of the UE.

According to a fifth aspect, an embodiment of the present disclosure provides a power allocation method, including:

determining, by user equipment UE, at least one uplink channel of a first target subframe numbered i, where i is a subframe number in 0~9;

determining, by the UE according to uplink channel information of a second target subframe numbered x, a reserved power that is reserved for a base station or a cell group in which the second target subframe numbered x is located, where the reserved power is determined when an uplink channel of the second target subframe numbered x includes a physical random access channel PRACH indicated by a physical downlink control channel order PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9; or the reserved power is determined when an uplink channel of the second target subframe numbered x includes a PRACH determined by using a physical downlink channel of a subframe numbered x-n, where n is an integer greater than or equal to 5; or the reserved power is determined when there is no PDCCH used to indicate another channel, except a sounding reference signal SRS channel, of an uplink channel of the second target subframe numbered x, and the second target subframe numbered x has no uplink channel or has only the SRS channel; and determining, by the UE according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

With reference to the fifth aspect, in a first possible embodiment, the determining, by the UE according to the reserved power, a transmit power of each uplink channel in the at least one uplink channel of the first target subframe numbered i includes:

when the sum of the transmit powers of all the uplink channels in the at least one uplink channel of the first target subframe numbered i and the reserved power is greater than the maximum transmit power of the UE, compressing, by the UE, at least one transmit power of the at least one uplink channel of the first target subframe numbered i, so that the sum of the transmit powers of all the uplink channels in the at least one uplink channel of the first target subframe numbered i and the reserved power is less than or equal to the maximum transmit power of the user equipment UE.

With reference to the fifth aspect or the first possible embodiment of the fifth aspect, in a second possible embodiment, the method further includes:

sending, by the UE according to the transmit power, a signal on the at least one uplink channel of the first target subframe numbered i.

With reference to the fifth aspect or either of the foregoing possible embodiments of the fifth aspect, in a third possible embodiment, the method further includes:

determining, by the UE by detecting the PDCCH order, that the uplink channel information of the second target subframe numbered x includes the physical random access channel PRACH; or determining, by the UE by detecting the physical downlink channel of the subframe numbered x-n, that the uplink channel information of the second target subframe numbered x includes the PRACH; or determining, by the UE by detecting the PDCCH, that the uplink channel information of the second target subframe numbered x includes only the sounding reference signal SRS channel or includes no channel.

With reference to the fifth aspect or any one of the foregoing possible embodiments of the fifth aspect, in a fourth possible embodiment, the determining, by the UE according to uplink channel information of a second target subframe numbered x, a reserved power that is reserved for a base station or a cell group in which the second target subframe numbered x is located includes:

determining, by the UE, the reserved power according to a PRACH predefined transmit power and a guaranteed power when the uplink channel of the second target subframe numbered x includes the PRACH, where the guaranteed power is a guaranteed power configured, by using higher layer signaling, for the base station or the cell group in which the second target subframe numbered x is located.

With reference to the fifth aspect or any one of the first three possible embodiments of the fifth aspect, in a fifth possible embodiment, the determining, by the UE according to uplink channel information of a second target subframe numbered x, a reserved power that is reserved for a base station or a cell group in which the second target subframe numbered x is located includes:

when the uplink channel of the second target subframe numbered x includes the PRACH, determining, by the UE, a priority of the PRACH and priorities of all the uplink channels of the first target subframe numbered i; and determining, by the UE, the reserved power according to a PRACH predefined transmit power and a guaranteed power when the priority of the PRACH is higher than the priorities of all the uplink channels of the first target subframe numbered i.

With reference to the fourth or fifth possible embodiment of the fifth aspect, in a sixth possible implementation manner, the determining, by the UE, the reserved power according to a PRACH predefined transmit power and a guaranteed power includes:

determining, by the UE, that a value of the reserved power is greater than or equal to max{the guaranteed power, the PRACH predefined transmit power}, where max means taking a maximum value.

With reference to any one of the fourth to sixth possible embodiments of the fifth aspect, in a seventh possible embodiment, the PRACH predefined transmit power is
min{$P_{CMAX,c}(j)$, PREAMBLE_RECEIVED_TARGET_POWER+$PL_c$}), where $P_{CMAX,c}(j)$ is a maximum transmit power of a subframe numbered j of a cell c in which the PRACH of the second target subframe numbered x is located, the preamble received target power PREAMBLE_RECEIVED_TARGET_POWER is a power parameter configured by a higher layer, $PL_c$ is a measurement value of a path loss of the UE, j=x−1, the subframe numbered j is a subframe previous to the subframe numbered x, and when x−1 is out of a range 0~9, the number of the subframe numbered j is (x−1)mod 10, where mod is a modulo operator; or the PRACH predefined transmit power is
PREAMBLE_RECEIVED_TARGET_POWER+$PL_c$.

With reference to the fifth aspect or any one of the first three possible embodiments of the fifth aspect, in an eighth possible embodiment, the determining, by the UE according to uplink channel information of a second target subframe numbered x, a reserved power that is reserved for a base station or a cell group in which the second target subframe numbered x is located includes:

when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, determining, by the UE, that the reserved power is 0.

According to a sixth aspect, an embodiment of the present disclosure provides a power allocation method, including:

determining, by user equipment UE, at least one uplink channel of a first target subframe numbered i, where i is a subframe number in 0~9;

when uplink channel information of the first target subframe numbered i includes a physical random access channel PRACH with a highest power allocation priority, determining, by the UE according to the uplink channel information of the first target subframe numbered i, a reserved power that is reserved for a base station or a cell group in which a second target subframe numbered x is located, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10, where mod is a modulo operator; and determining, by the UE according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

With reference to the sixth aspect, in a first possible embodiment, the determining, by the UE according to the reserved power, a transmit power of each uplink channel in the at least one uplink channel of the first target subframe numbered i includes:

when the sum of the transmit powers of all the uplink channels in the at least one uplink channel of the first target subframe numbered i and the reserved power is greater than the maximum transmit power of the UE, compressing, by the UE, at least one transmit power of the at least one uplink channel of the first target subframe numbered i, so that the sum of the transmit powers of all the uplink channels in the at least one uplink channel of the first target subframe numbered i and the reserved power is less than or equal to the maximum transmit power of the UE.

With reference to the sixth aspect or the first possible embodiment of the sixth aspect, in a second possible embodiment, the method further includes:

sending, by the UE according to the transmit power, a signal on the at least one uplink channel of the first target subframe numbered i.

With reference to the sixth aspect or either of the foregoing possible embodiments of the sixth aspect, in a third possible embodiment, the determining, by the UE according to the uplink channel information of the first target subframe numbered i, a reserved power that is reserved for a base station or a cell group in which a second target subframe numbered x is located includes:

determining, by the UE, the reserved power according to a PRACH transmit power and a guaranteed power, where the PRACH transmit power is a transmit power of the PRACH of the first target subframe numbered i, the guaranteed power is a guaranteed power configured, by using higher layer signaling, for the base station or the cell group in which the second target subframe numbered x is located, and the reserved power is less than or equal to the guaranteed power and less than or equal to a difference between the maximum transmit power of the UE and the PRACH transmit power.

With reference to the third possible embodiment of the sixth aspect, in a fourth possible embodiment, the PRACH transmit power is $\min\{P_{CMAX,c}(i), \text{PREAMBLE\_RECEIVED\_TARGET\_POWER}+PL_c\}$, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, and $PL_c$ is a measurement value of a path loss of the UE.

The embodiments of the present disclosure provide the user equipment and the power allocation method. In the prior art, a problem is as follows: A guaranteed power is preset for a base station or a cell group in which a subframe j+1 is located, without considering actual transmit power allocation of an uplink channel of the subframe j+1; then, a transmit power, which is to be allocated to a subframe i, of a corresponding uplink channel is decided according to the guaranteed power; and consequently, receiving performance of an uplink channel of UE in a base station of a cell in which the UE is located is affected when a reserved transmit power (the guaranteed power) of the uplink channel is improper. By comparison, in the present disclosure, at least one uplink channel of a first target subframe numbered i is determined; according to uplink channel information of a second target subframe numbered x, a reserved power that is reserved for a base station or a cell group in which the second target subframe numbered x is located is determined, where the reserved power is determined when the uplink channel information of the second target subframe numbered x (x=j+1) includes a PRACH or includes only an SRS channel or includes no channel, where a transmission time of the second target subframe numbered x and a transmission time of the first target subframe numbered i overlap, and a start time of the second target subframe is later than a start time of the first target subframe numbered i; and then according to the reserved power, a transmit power of each uplink channel of the first target subframe numbered i is determined, thereby achieving a purpose of properly allocating a transmit power of an uplink channel.

BRIEF DESCRIPTION OF DRAWINGS

FIG. 9(*a*) is a schematic diagram of subframe structures corresponding to two asynchronous cells used in a power allocation method according to an embodiment of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with another system by using the signal).

Figure 2:
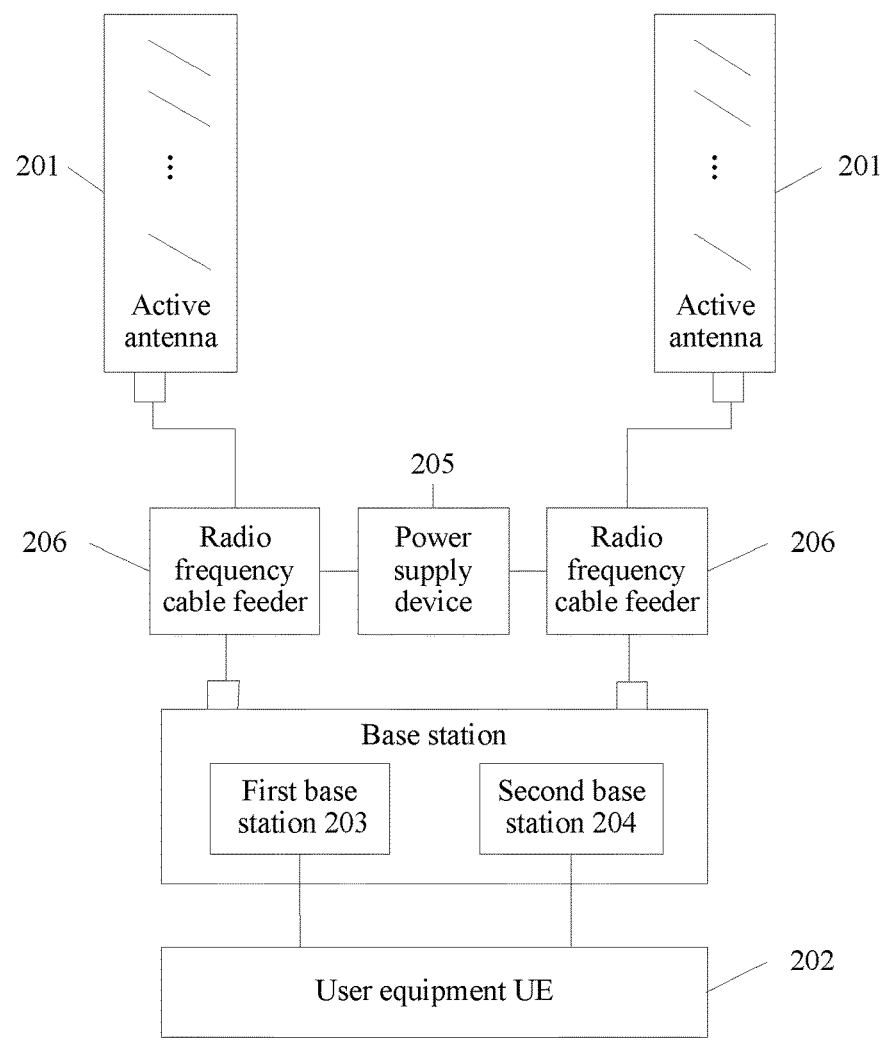
FIG. 2 is a schematic diagram of a connection between UE and a base station in a wireless communications system according to an embodiment of the present disclosure.

The present disclosure is applicable to a wireless communications system. As shown in FIG. 2, the system includes an active antenna 201, UE 202, a first base station 203, a second base station 204, a power supply device 205, and a radio frequency cable feeder 206.

The active antenna 201 is a transmit-receive integrated antenna, mainly converts an electrical signal into an electromagnetic wave propagated in the air, and converts an electromagnetic wave signal propagated in the air into an electrical signal.

The UE 202 is a user terminal that performs information transmission with the base station 203 by using a mobile communications switching center. For the present disclosure, the UE 202 is configured to: determine at least one uplink channel of a first target subframe numbered i; determine, according to uplink channel information of a second target subframe numbered x, a reserved power that is reserved for a base station or a cell group in which the second target subframe numbered x is located, where the reserved power is determined when an uplink channel of the second target subframe numbered x includes a PRACH (physical random access channel) indicated by a PDCCH order (physical downlink control channel order), or the reserved power is determined when an uplink channel of the second target subframe numbered x includes a PRACH determined by using a physical downlink channel of a subframe numbered x-n, or the reserved power is determined when there is no PDCCH used to indicate another channel, except an SRS (sounding reference signal) channel, of an uplink channel of the second target subframe numbered x, and the second target subframe numbered x has no uplink channel or has only the SRS channel; and determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

That the second target subframe numbered x has no uplink channel or has only the SRS channel means that there is no other manner for configuring another channel, except the SRS channel, of the uplink channel, such as an uplink PUCCH configured by using higher layer signaling, for the second target subframe numbered x, where i and x are subframe numbers; when i or x is out of a range 0~9, the subframe number is i mod 10 or (x)mod 10. A transmission time of the second target subframe numbered x and a transmission time of the first target subframe overlap, a start time of the second target subframe is later than a start time of the first target subframe, and the second target subframe is a subframe that belongs to a base station or a cell group different from that of the first target subframe.

Figure 1:
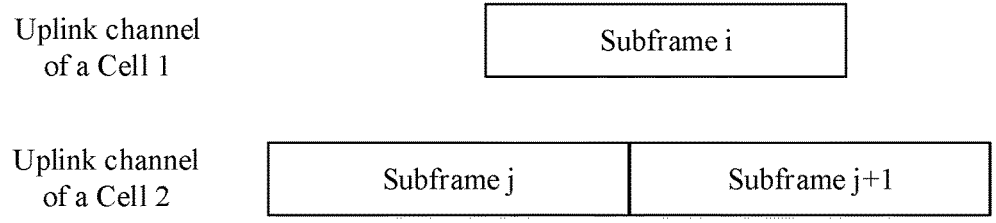
FIG. 1 is a schematic diagram of subframe structures corresponding to two cells with asynchronous uplink transmission times used in user equipment UE according to an embodiment of the present disclosure.

In the present disclosure, any subframe in the second target subframe numbered x corresponds to a subframe j+1 shown in FIG. 1.

For ease of description, the first target subframe numbered i belongs to the first base station 203, and the second target subframe numbered x belongs to the second base station 204. At least one cell that is of each base station and serves the UE 202 is called a cell group. In the present disclosure, a base station may be considered equivalent to a cell group.

It should be noted that downlink transmission times are synchronous between different cells of one base station. Therefore, uplink subframes of the different cells are basically aligned. However, because TAs (timing advances) of the different cells may be different, a small difference of uplink subframe timing may exist between the different cells, and the difference is less than one symbol. In the present disclosure, a subframe numbered i represents uplink subframes, which are basically aligned in terms of time, of one or more active cells of one base station, and numbers of these subframes are i; a subframe numbered x represents uplink subframes, which are basically aligned in terms of time, of one or more active cells of another base station, and numbers of these subframes are x. That is, a first target subframe that belongs to one base station refers to multiple subframes numbered identically, and each subframe corresponds to one cell, namely, a quantity of cells served by one base station is the same as a quantity of subframes, which have a same subframe number, of this base station.

The base station (the first base station 203 or the second base station 204) is a form of a radio station, and refers to a radio transceiver station that performs, in a specified radio coverage area, information transmission with a mobile telephone terminal (such as the UE 202 in this system) by using a mobile communications switching center. In the present disclosure, the base station (the first base station 203 or the second base station 204) is further configured to send a PDCCH or send a PDCCH and a PDSCH (physical downlink shared channel) to the UE 202, so that the UE 202 learns, according to an indication in the PDCCH order, that the uplink channel information of the second target subframe numbered x includes a PRACH; learns, according to the physical downlink channel (including the PDCCH and the PDSCH) of the subframe numbered x-n, that the uplink channel information of the second target subframe numbered x includes a PRACH; and according to a fact that there is no PDCCH used to indicate the another channel, except the SRS (sounding reference signal) channel, of the uplink channel of the second target subframe numbered x (that is, the uplink channel information of the second target subframe numbered x includes only the SRS channel or includes no channel), according to a fact that the second target subframe numbered x has no uplink channel or has only the SRS channel, and according to a physical downlink channel (including a PDCCH and/or a PDSCH) of a subframe numbered i-m, learns that uplink channel information of the first target subframe numbered i includes a PRACH with a highest power allocation priority. Then, the reserved power, which is reserved for the base station or the cell group in which the second target subframe numbered x is located, is determined according to the uplink channel information of the second target subframe numbered x or according to the uplink channel information of the first target subframe numbered i, where m is an integer greater than or equal to 4.

Optionally, in the present disclosure, the base station may be an eNB (evolved NodeB).

The power supply device 205 converts an externally input direct current/alternating current into a direct current required by the system, and then outputs the direct current to the radio frequency cable feeder 206.

The radio frequency cable feeder 206 is configured to connect the active antenna 201 and the base stations (the first base station 203 the second base station 204).

It may be understood that devices included in the wireless communications system are not limited to the devices listed above.

Figure 3:
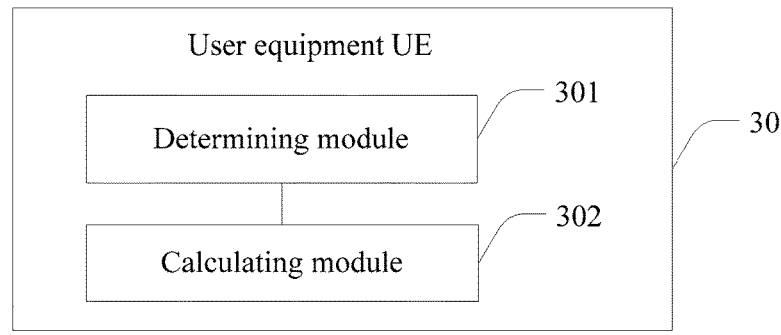
FIG. 3 is a schematic structural diagram of user equipment UE according to an embodiment of the present disclosure.

FIG. 3 shows an apparatus 30 for performing a power allocation method in a wireless communications system, that is, user equipment UE 30. The user equipment UE 30 corresponds to the UE 202 shown in FIG. 2. The user equipment UE 30 includes a determining module 301 and a calculating module 302.

The determining module 301 is configured to determine at least one uplink channel of a first target subframe numbered i, and provide the calculating module 302 with the at least one uplink channel of the first target subframe numbered i, where i is a subframe number in 0~9.

The determining module 301 is further configured to determine, according to uplink channel information of a second target subframe numbered x, a reserved power that is reserved for a base station or a cell group in which the second target subframe numbered x is located, where the reserved power is determined when an uplink channel of the second target subframe numbered x includes a physical random access channel PRACH indicated by a physical downlink control channel order PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or the reserved power is determined when an uplink channel of the second target subframe numbered x includes a PRACH determined by using a physical downlink channel of a subframe numbered x-n, where n is an integer greater than or equal to 5, or the reserved power is determined when there is no PDCCH used to indicate another channel, except a sounding reference signal SRS channel, of an uplink channel of the second target subframe numbered x, and the second target subframe numbered x has no uplink channel or has only the SRS channel; and provide the calculating module 302 with the reserved power.

The reserved power is a transmit power that is reserved by the UE for the base station or the cell group in which the second target subframe numbered x is located, so that the UE can transmit, in the second target subframe numbered x, an uplink channel corresponding to a subframe numbered x. It may be understood that a value of the reserved power is less than or equal to an actual transmit power of a base station or a cell group in which the subframe numbered x is located.

The calculating module 302 is configured to determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

This embodiment of the present disclosure provides a power allocation apparatus. In the prior art, a problem is as follows: A guaranteed power is preset for a base station or a cell group in which a subframe x is located, without considering actual transmit power allocation of an uplink channel of the subframe x (a subframe j+1); then, a transmit power, which is to be allocated to a subframe i, of a corresponding uplink channel is decided according to the guaranteed power; and consequently, receiving performance of an uplink channel of UE in a base station of a cell in which the UE is located is affected when a reserved transmit power (the guaranteed power) of the uplink channel is improper. By comparison, in the present disclosure, a determining module determines at least one uplink channel of a first target subframe numbered i, and determines, according to uplink channel information of a second target subframe numbered x, a reserved power that is reserved for a base station or a cell group in which the second target subframe numbered x is located, where the reserved power is determined when the uplink channel information of the second target subframe numbered x includes a PRACH or includes only an SRS channel or includes no channel, where a transmission time of the second target subframe numbered x and a transmission time of the first target subframe numbered i overlap, and a start time of the second target subframe is later than a start time of the first target subframe numbered i; and then a calculating module determines, according to the reserved power, a transmit power of each uplink channel in the at least one uplink channel of the first target subframe numbered i, thereby achieving a purpose of properly allocating a transmit power of an uplink channel.

Figure 4:
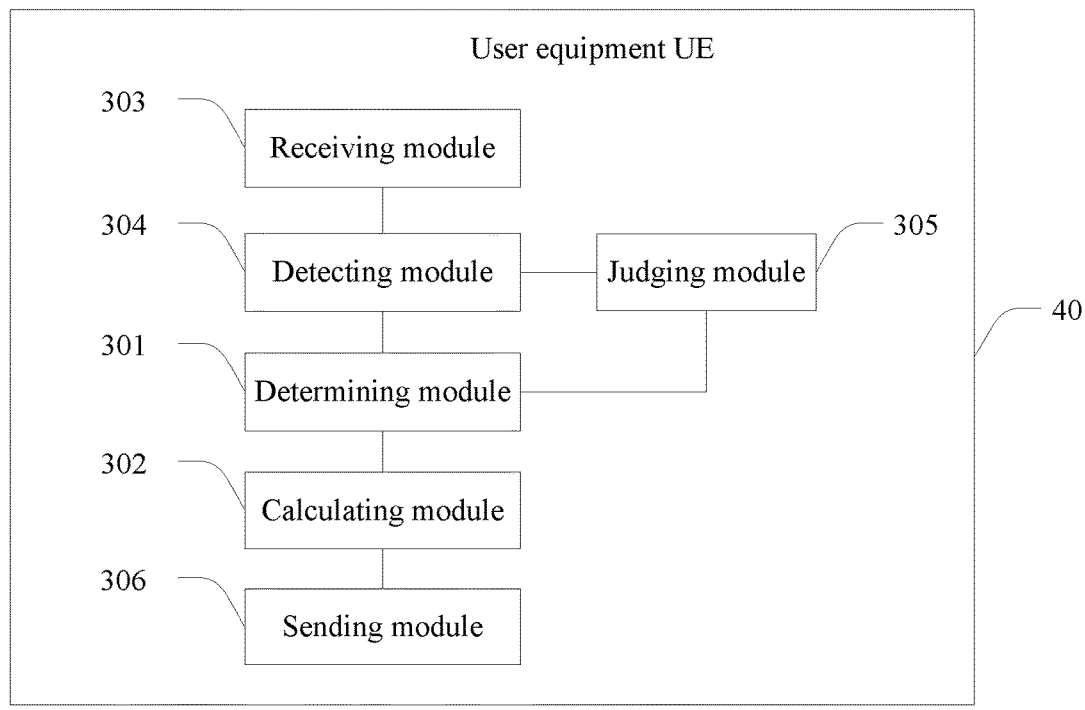
FIG. 4 is a schematic structural diagram of another user equipment UE according to an embodiment of the present disclosure.

Further, optionally, the present disclosure further provides another user equipment UE 40. As shown in FIG. 4, the user equipment UE 40 further includes a receiving module 303, a detecting module 304, a judging module 305, and a sending module 306.

The receiving module 303 is configured to receive the PDCCH order; receive the physical downlink channel of the subframe numbered x-n; receive the PDCCH; and provide the detecting module 304 with the PDCCH order, the physical downlink channel of the subframe numbered x-n, and the PDCCH.

Further, the detecting module 304 is configured to detect the PDCCH order; detect the physical downlink channel of the subframe numbered x-n; detect the PDCCH; and provide the determining module 301 with a detection result.

The determining module 301 is further configured to: according to the detection result, determine that the uplink channel information, which is carried in the PDCCH order, of the second target subframe numbered x includes the physical random access channel PRACH; or according to the detection result, determine that the uplink channel information, which is carried in the physical downlink channel of the subframe numbered x-n, of the second target subframe numbered x includes the PRACH; or according to the detection result, determine that the uplink channel information, which is carried in the PDCCH, of the second target subframe numbered x includes only the sounding reference signal SRS channel or includes no channel.

Further, optionally, when the uplink channel of the second target subframe numbered x includes the PRACH, the determining module 301 determines the reserved power according to a PRACH predefined transmit power and a guaranteed power, where the PRACH predefined transmit power is a transmit power predefined for the PRACH, and the guaranteed power is a guaranteed power configured, by using higher layer signaling, for the base station or the cell group in which the second target subframe numbered x is located, where the higher layer signaling may be RRC signaling.

Further, optionally, when the detecting module 304 detects that the uplink channel of the second target subframe numbered x includes the PRACH, the judging module 305 is configured to determine a priority of the PRACH and priorities of all the uplink channels of the first target subframe numbered i, and provide the determining module 301 with a determining result.

The determining module 301 is further configured to determine the reserved power according to a PRACH predefined transmit power and a guaranteed power when the determining result is that the priority of the PRACH is higher than the priorities of all the uplink channels of the first target subframe numbered i.

The value of the reserved power determined by the determining module 301 may be greater than or equal to max{the guaranteed power, the PRACH predefined transmit power}. For example, the reserved power=max{the guaranteed power, the PRACH predefined transmit power}, where max means taking a maximum value.

Optionally, the PRACH predefined transmit power is: min{$P_{CMAX,c}(j)$, PREAMBLE_RECEIVED_TARGET_POWER+$PL_c$}, where $P_{CMAX,c}(j)$ is a maximum transmit power of a subframe j of a cell c in which the PRACH of the second target subframe numbered x is located; the preamble received target power PREAMBLE_RECEIVED_TARGET_POWER is a power parameter configured by a higher layer; and $PL_c$ is a measurement value of a path loss of the UE, where $PL_c$ may be obtained by the UE by measuring a reference signal of the cell c or another reference cell; and j=x−1, the subframe numbered j is a subframe previous to the subframe numbered x, and when x−1 is out of a range 0~9, the number of the subframe j is (x−1)mod 10, where mod is a modulo operator.

Alternatively, the PRACH predefined transmit power may be:

PREAMBLE_RECEIVED_TARGET_POWER+$PL_c$.

Further, optionally, when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, the determining module 301 determines that the reserved power is 0.

It should be noted that the reserved power 0 reserved by the determining module 301 herein for the base station or the cell group in which the second target subframe numbered x is located may indicate that the determining module 301 reserves no power for the base station or the cell group in which the second target subframe numbered x is located.

Further, optionally, the calculating module 302 is configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

Because the calculating module 302 calculates, according to a transmit power control formula of the uplink channel, the transmit power of each uplink channel of the first target subframe numbered i, when a total transmit power of all the uplink channels of the first target subframe numbered i exceeds a remaining transmit power that is obtained after the reserved power is subtracted from the maximum transmit power of the UE, the calculating module 302 performs power compression according to a transmit power allocation priority of the uplink channel of the first target subframe numbered i, that is, preferentially allocates power to a channel with a higher priority. When the transmit power of the uplink channel is not enough, the transmit power of the uplink channel is compressed to ensure that the sum of the transmit powers of all the uplink channels of the first target subframe numbered i and the reserved power is less than or equal to the maximum transmit power of the UE.

After the calculating module 302 determines, according to the reserved power, the transmit power of each uplink channel in the at least one uplink channel of the first target subframe numbered i, the sending module 304 sends, according to the transmit power, a signal on the at least one uplink channel of the first target subframe numbered i.

It should be noted that the determining module 301, the calculating module 302, the detecting module 304, and the judging module 305 shown in FIG. 3 and FIG. 4 may be a processing module or a processor such as a baseband processor and/or a CPU (central processing unit).

In the present disclosure, before a determining module determines a transmit power of an uplink channel of a first target subframe numbered i, when the determining module determines that uplink channel information of a second target subframe numbered x includes a PRACH or includes only an SRS channel or includes no channel, a reserved power determined for a base station or a cell group in which the second target subframe numbered x is located is more proper, and therefore, a transmit power, which is decided by a calculating module, of each uplink channel of the first target subframe numbered i is also proper, thereby resolving a problem of low receiving performance of an uplink channel of UE in a base station of a cell in which the UE is located.

Figure 5:
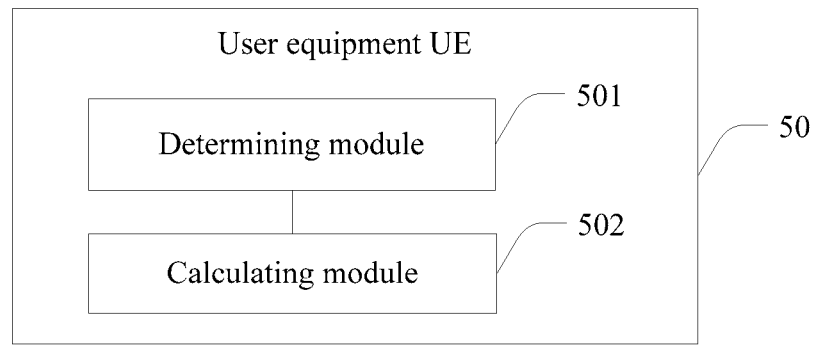
FIG. 5 is a schematic structural diagram of still another user equipment UE according to an embodiment of the present disclosure.

As shown in FIG. 5, the present disclosure further provides user equipment UE 50, where the user equipment UE 50 corresponds to the UE 202 shown in FIG. 2. The user equipment UE 50 includes a determining module 501 and a calculating module 502.

The determining module 501 is configured to determine at least one uplink channel of a first target subframe numbered i, and provide the calculating module 502 with the at least one uplink channel of the first target subframe numbered i, where i is a subframe number in 0~9.

The determining module 501 is configured to: when uplink channel information of the first target subframe numbered i includes a PRACH with a highest power allocation priority, determine, according to the uplink channel information of the first target subframe numbered i, a reserved power that is reserved for a base station or a cell group in which a second target subframe numbered x is located; and provide the calculating module 502 with the reserved power, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10.

By comparing all uplink channels that have a time overlap with the first target subframe numbered i, the determining module 501 determines that a power allocation priority of the PRACH of the first target subframe numbered i is the highest. All the uplink channels include a PUCCH, a PUSCH, a PRACH, an SRS, and the like. A power allocation priority of a channel is predefined. For example, a priority of the PRACH is higher than those of other types of channels; a priority of a PRACH of a primary cell of a base station or a cell group is higher than that of a PRACH of a secondary cell; and a priority of a PRACH of a primary base station or a primary cell group is higher than that of a PRACH of a secondary base station or a secondary cell group. When a base station or a cell group in which the first target subframe numbered i is located is a primary base station or a primary cell group, and a cell in which the PRACH is located is a primary cell in the primary cell group, the PRACH included in the uplink channel of the first target subframe numbered i is an uplink channel with a highest power allocation priority.

The calculating module 502 is configured to determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

Figure 6:
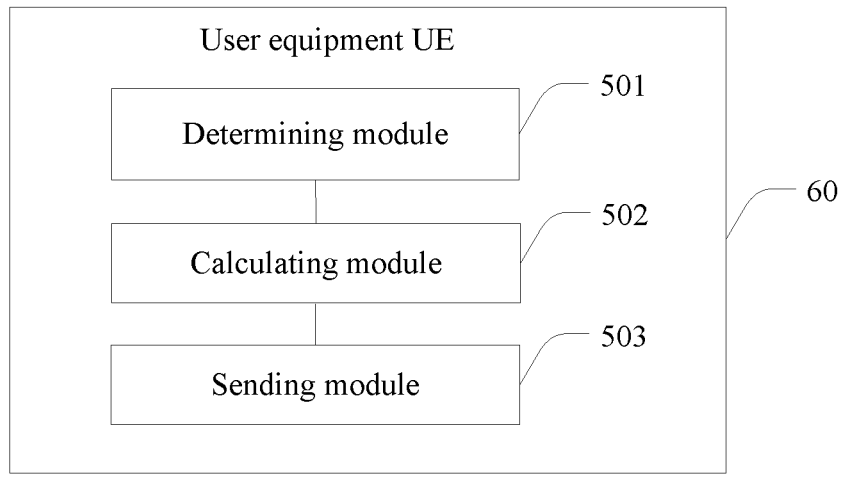
FIG. 6 is a schematic structural diagram of yet another user equipment UE according to an embodiment of the present disclosure.

Further, the present disclosure further provides user equipment UE 60. As shown in FIG. 6, the user equipment UE 60 further includes a sending module 503.

After the calculating module 502 determines, according to the reserved power, the transmit power of each uplink channel in the at least one uplink channel of the first target subframe numbered i, the sending module 503 sends, according to the transmit power, a signal on the at least one uplink channel of the first target subframe numbered i.

Further, optionally, the calculating module 502 is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

Being the same as the user equipment 40, because the calculating module 502 calculates, according to a power control formula of the uplink channel, the power of each uplink channel of the first target subframe numbered i, when a total transmit power of all the uplink channels of the first target subframe numbered i exceeds a remaining power that is obtained after the reserved power is subtracted from the maximum transmit power of the UE, power compression is performed according to a priority of the uplink channel of the first target subframe numbered i, so as to ensure that the sum of the transmit powers of all the uplink channels of the first target subframe numbered i and the reserved power is less than or equal to the maximum transmit power of the UE.

Further, optionally, the determining module 501 determines the reserved power according to a PRACH transmit power and a guaranteed power, where the PRACH transmit power is a transmit power of the PRACH of the first target subframe numbered i, the guaranteed power is a guaranteed power configured, by using higher layer signaling, for the base station or the cell group in which the second target subframe numbered x is located, and the reserved power is less than or equal to the guaranteed power and less than or equal to a difference between the maximum transmit power $P_{CMAX}$ of the UE and the PRACH transmit power. For example, the reserved power=max{the guaranteed power, $P_{CMAX}$-the PRACH transmit power}. The higher layer signaling may be RRC signaling.

The PRACH transmit power may be:
min{$P_{CMAX,c}(i)$, PREAMBLE_RECEIVED_TARGET_POWER+$PL_c$}, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, $PL_c$ is a measurement value of a path loss of the UE, and $PL_c$ may be obtained by the UE by measuring a reference signal of the cell c or another reference cell.

In the present disclosure, before a determining module determines a transmit power of an uplink channel of a first target subframe numbered i, when the determining module determines that uplink channel information of the first target subframe numbered i includes a PRACH with a highest power allocation priority, a reserved power, which is determined by the determining module according to the uplink channel information of the first target subframe numbered i for a base station or a cell group in which a second target subframe numbered x is located, is more proper, and a transmit power, which is decided by a calculating module, of each uplink channel of the first target subframe numbered i is also proper, thereby resolving a problem of low receiving performance of an uplink channel of UE in a base station of a cell in which the UE is located.

It should be noted that the determining module 501 and the calculating module 502 shown in FIG. 5 and FIG. 6 may be a processing module or a processor such as a baseband processor and/or a CPU.

It should be noted that the present disclosure may further provide another user equipment UE, and functions of modules in this apparatus may include functions of all modules shown in FIG. 3, FIG. 4, FIG. 5, and FIG. 6.

Figure 7:
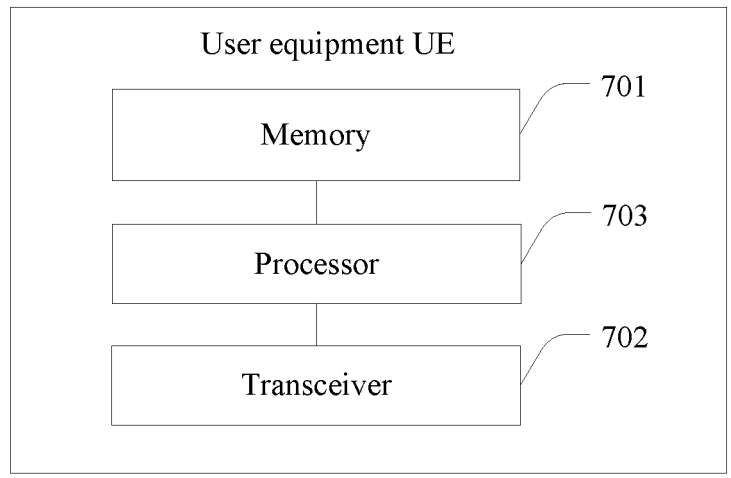
FIG. 7 is a hardware structure diagram of user equipment UE according to an embodiment of the present disclosure.

As shown in FIG. 7, FIG. 7 is a schematic diagram of a hardware structure of UE. The UE may include a memory 701, a transceiver 702, and a processor 703.

The memory 701 may be a read only memory (ROM), a static storage device, a dynamic storage device, or a random access memory (RAM). The memory 701 may store an operating system and another application program. When the technical solution provided in the embodiment of the present disclosure is implemented by using software or firmware, program code used to implement the technical solution provided in the embodiment of the present disclosure is stored in the memory 701 and is executed by the processor 703.

The transceiver 702 is used for communication between the apparatus and other devices or other communications networks (for example but without being limited to, Ethernet, a radio access network (RAN), and a wireless local area network (WLAN). For the present disclosure, the transceiver 702 is configured to receive a PDCCH or a PDCCH and a PDSCH sent by a base station.

The processor 703 may be a general-purpose central processing unit (CPU), a microprocessor, an application specific integrated circuit (ASIC), or one or more integrated circuits, and is configured to execute a related program to implement the technical solution provided in the embodiment of the present disclosure.

It should be noted that the hardware shown in FIG. 7 shows only the memory 701, the transceiver 702, and the processor 703, but in a specific implementation process, a person skilled in the art should understand that the terminal further includes other components required for normal running. In addition, according to a specific requirement, a person skilled in the art should understand that hardware components for implementing other functions may also be included.

Specifically, when the UE shown in FIG. 7 is used to implement the apparatus in the embodiments shown in FIG. 3 and FIG. 4, the processor 703 in the apparatus is configured to be coupled to the memory 701 and the transceiver 702 and is configured to control execution of a program instruction, and is specifically configured to: determine at least one uplink channel of a first target subframe numbered i, where i is a subframe number in 0~9; determine, according to uplink channel information of a second target subframe numbered x, a reserved power that is reserved for a base station or a cell group in which the second target subframe numbered x is located, where the reserved power is determined when an uplink channel of the second target subframe numbered x includes a PRACH indicated by a PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or the reserved power is determined when an uplink channel of the second target subframe numbered x includes a PRACH determined by using a physical downlink channel of a subframe numbered x-n, where n is an integer greater than or equal to 5, or the reserved power is determined when there is no PDCCH used to indicate another channel, except an SRS channel, of an uplink channel of the second target subframe numbered x, and the second target subframe numbered x has no uplink channel or has only the SRS channel; and determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

Further, optionally, the processor 703 is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

Further, after the processor 703 determines, according to the reserved power, the transmit power of each uplink channel in the at least one uplink channel of the first target subframe numbered i, the transceiver 702 is further configured to send, according to the transmit power, a signal on the at least one uplink channel of the first target subframe numbered i.

Further, optionally, the transceiver 702 is further configured to receive the PDCCH order; receive the physical downlink channel of the subframe numbered x-n; receive the PDCCH; and provide the processor 703 with the PDCCH order, the physical downlink channel of the subframe numbered x-n, and the PDCCH.

The processor 703 is further configured to: by detecting the PDCCH order, determine that the uplink channel information of the second target subframe numbered x includes the physical random access channel PRACH; or by detecting the physical downlink channel of the subframe numbered x-n, determine that the uplink channel information of the second target subframe numbered x includes the PRACH; or by detecting the PDCCH, determine that the uplink channel information of the second target subframe numbered x includes only the SRS channel or includes no channel.

When the uplink channel of the second target subframe numbered x includes the PRACH, the processor 703 determines the reserved power according to a PRACH predefined transmit power and a guaranteed power, where the PRACH predefined transmit power is a transmit power predefined for the PRACH, and the guaranteed power is a guaranteed power configured, by using radio resource control RRC signaling, for the base station or the cell group in which the second target subframe numbered x is located.

Further, when the uplink channel of the second target subframe numbered x includes the PRACH, the processor 703 is further configured to determine a priority of the PRACH and priorities of all the uplink channels of the first target subframe numbered i.

When the priority of the PRACH is higher than the priorities of all the uplink channels of the first target subframe numbered i, the processor 703 determines the reserved power according to a PRACH predefined transmit power and a guaranteed power.

A value of the reserved power may be greater than or equal to max{the guaranteed power, the PRACH predefined transmit power}. For example, the reserved power=max{the guaranteed power, the PRACH predefined transmit power}.

The PRACH predefined transmit power may be:

min{$P_{CMAX,c}(j)$, PREAMBLE_RECEIVED_TARGET_POWER+$PL_c$}, where $P_{CMAX,c}(j)$ is a maximum transmit power of a subframe numbered j of a cell c in which the PRACH of the second target subframe numbered x is located, the preamble received target power PREAMBLE_RECEIVED_TARGET_POWER is a power parameter configured by a higher layer, $PL_c$ is a measurement value of a path loss of the UE, and the path loss may be obtained by the UE by measuring a reference signal of the cell c or another reference cell, where j=x−1, the subframe numbered j is a subframe previous to the subframe numbered x, and when x−1 is out of a range 0~9, the number of the subframe numbered j is (x−1)mod 10, where mod is a modulo operator.

Alternatively, the PRACH predefined transmit power may be:

PREAMBLE_RECEIVED_TARGET_POWER+$PL_c$.

Further, optionally, when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, the processor 703 determines that the reserved power is 0.

Optionally, the memory 701, the transceiver 702, and the processor 703 may also be communicatively connected by using a bus, where the bus may include a path for transmitting information between parts (such as the memory 701, the transceiver 702, and the processor 703) of the apparatus.

In the present disclosure, a reserved power reserved for a base station or a cell group in which a second target subframe numbered x is located may be more proper, and therefore, a decided transmit power of each uplink channel of a first target subframe numbered i is also proper, thereby resolving a problem of low receiving performance of an uplink channel of UE in a base station of a cell in which the UE is located.

Figure 8:
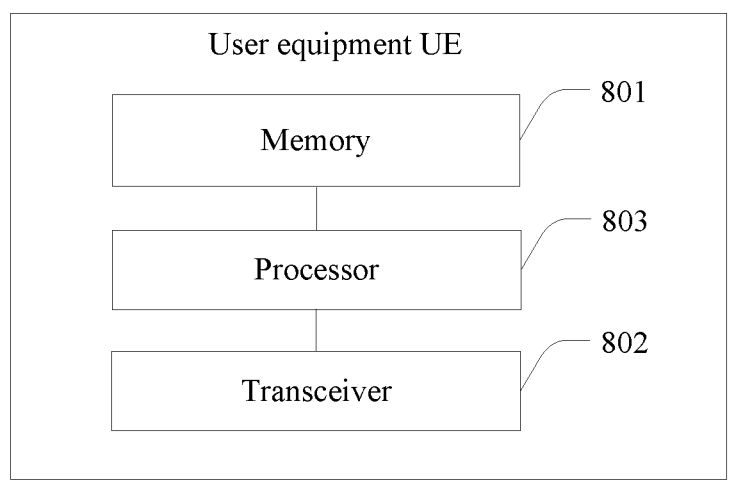
FIG. 8 is a hardware structure diagram of another user equipment UE according to an embodiment of the present disclosure.

As shown in FIG. 8, FIG. 8 is a schematic diagram of a hardware structure of user equipment UE. The user equipment UE may include a memory 801, a transceiver 802, and a processor 803.

For an overview of common functions of the memory 801, the transceiver 802, and the processor 803 in the apparatus, refer to the description about the memory 701, the transceiver 702, and the processor 703 included in the UE shown in FIG. 7, and details are not described herein again.

It should be noted that the hardware shown in FIG. 8 shows only the memory 801, the transceiver 802, and the processor 803, but in a specific implementation process, a person skilled in the art should understand that the terminal further includes other components required for normal running. In addition, according to a specific requirement, a person skilled in the art should understand that hardware components for implementing other functions may also be included.

Specifically, when the UE shown in FIG. 8 is used to implement the apparatus in the embodiments shown in FIG. 5 and FIG. 6, the transceiver 802 in the apparatus is configured to receive a PDCCH or a PDCCH and a PDSCH sent by a base station.

The processor 803 is coupled to the memory 801 and the transceiver 802, is configured to control execution of a program instruction, and is specifically configured to: determine at least one uplink channel of a first target subframe numbered i, where i is a subframe number in 0~9; when uplink channel information of the first target subframe numbered i includes a physical random access channel PRACH with a highest power allocation priority, determine, according to the uplink channel information of the first target subframe numbered i, a reserved power that is reserved for a base station or a cell group in which a second target subframe numbered x is located, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10, where mod is a modulo operator; and determine, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

Further, optionally, the processor 803 is further configured to: when the sum of the transmit powers of all the uplink channels in the at least one uplink channel of the first target subframe numbered i and the reserved power is greater than the maximum transmit power of the UE, compress at least one transmit power of the at least one uplink channel of the first target subframe numbered i.

Further, after the processor 803 determines, according to the reserved power, the transmit power of each uplink channel in the at least one uplink channel of the first target subframe numbered i, the transceiver 802 is further configured to send, according to the transmit power, a signal on the at least one uplink channel of the first target subframe numbered i.

Further, the processor 803 is further configured to determine the reserved power according to a PRACH transmit power and a guaranteed power, where the PRACH transmit power is a transmit power of the PRACH of the first target subframe numbered i, the guaranteed power is a guaranteed power configured, by using higher layer signaling, for the base station or the cell group in which the second target subframe numbered x is located, and the reserved power is less than or equal to the guaranteed power and less than or equal to a difference between the maximum transmit power $P_{CMAX}$ of the UE and the PRACH transmit power. For example, the reserved power=max{the guaranteed power, $P_{CMAX}$-the PRACH transmit power}. The higher layer signaling may be RRC signaling.

Optionally, the PRACH transmit power may be:

$\min\{P_{CMAX,c}(i), \text{PREAMBLE\_RECEIVED\_TARGET\_POWER}+PL_c\}$, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, $PL_c$ is a measurement value of a path loss of the UE, and the path loss may be obtained by the UE by measuring a reference signal of the cell c or another reference cell.

Likewise, in the user equipment UE shown in FIG. 8, the memory 801, the transceiver 802, and the processor 803 may also be communicatively connected by using a bus.

In the present disclosure, a reserved power reserved for a base station or a cell group in which a second target subframe numbered x is located may be more proper, and therefore, a decided transmit power of each uplink channel of a first target subframe numbered i is also proper, thereby resolving a problem of low receiving performance of an uplink channel of UE in a base station of a cell in which the UE is located.

With reference to the description in FIG. 3 to FIG. 8, the present disclosure provides a power allocation method. As shown in FIG. 9, the method specifically includes:

901. UE determines at least one uplink channel of a first target subframe numbered i, where i is a subframe number in 0~9.

902. The UE determines, according to uplink channel information of a second target subframe numbered x, a reserved power that is reserved for a base station or a cell group in which the second target subframe numbered x is located, where the reserved power is determined when an uplink channel of the second target subframe numbered x includes a PRACH indicated by a PDCCH order, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9; or the reserved power is determined when an uplink channel of the second target subframe numbered x includes a PRACH determined by using a physical downlink channel of a subframe numbered x-n; or the reserved power is determined when there is no PDCCH used to indicate another channel, except an SRS channel, of an uplink channel of the second target subframe numbered x, and the second target subframe numbered x has no uplink channel or has only the SRS channel.

903. The UE determines, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

According to the power allocation method provided in this embodiment of the present disclosure, at least one uplink channel of a first target subframe numbered i is determined; according to uplink channel information of a second target subframe numbered x, a reserved power that is reserved for a base station or a cell group in which the second target subframe numbered x is located is determined, where the reserved power is determined when uplink channel information of the second target subframe numbered x includes a PRACH or includes only an SRS channel or includes no channel, where a transmission time of the second target subframe numbered x and a transmission time of the first target subframe numbered i overlap, and a start time of the second target subframe is later than a start time of the first target subframe numbered i; and then according to the reserved power, a transmit power of each uplink channel of the first target subframe numbered i is determined, thereby achieving a purpose of properly allocating a transmit power of an uplink channel.

Further, in step 901, there are two manners for the UE to determine the at least one uplink channel of the first target subframe numbered i.

Manner 1: By using the PDCCH, the UE acquires DCI (downlink control information), and then according to the DCI, determines the at least one uplink channel of the first target subframe numbered i.

The DCI includes resource allocation information, power control information, and the like at the first target subframe numbered i.

Manner 2: According to configuration of higher layer signaling (such as RRC signaling), the UE determines the at least one uplink channel of the first target subframe numbered i.

Further, in step 902, by detecting a physical downlink channel (a PDCCH and a PDSCH), the UE may determine the uplink channel information of the second target subframe numbered x.

First, by detecting the PDCCH order, the UE may determine that the uplink channel information of the second target subframe numbered x includes the PRACH.

Specifically, in a subframe numbered x-k (assumed as a third target subframe), the base station sends a PDCCH order to the UE, where the PDCCH order triggers the UE to initiate random access by using a PRACH, and then, the UE uses the PRACH to initiate random access in the second target subframe numbered x. It indicates that a time at which the UE determines the uplink channel information of the second target subframe numbered x is earlier than a time at which the UE determines the at least one uplink channel of the first target subframe numbered i, where k is an integer greater than or equal to 6.

Optionally, k is 6.

Figure 9A:
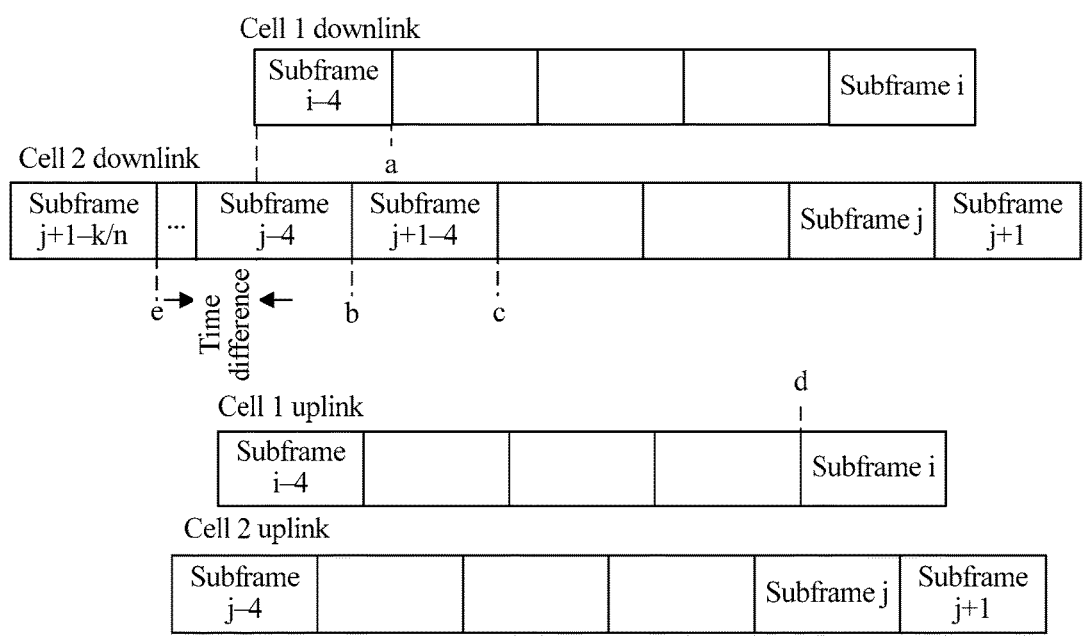
FIG. 9 is a flowchart of a power allocation method according to an embodiment of the present disclosure.

It should be noted in advance that j+1 shown in FIG. 9(a) is x described above, j is equal to x−1 correspondingly, and j−4 is equal to x−5 correspondingly.

As shown in FIG. 9(a), it may be understood that downlink transmission times are not synchronous between a Cell 1 and a Cell 2 (the downlink transmission time of the Cell 2 is earlier than the downlink transmission time of the Cell 1), and consequently uplink transmission times are not synchronous between the Cell 1 and the Cell 2 (the uplink transmission time of the Cell 2 is earlier than the uplink transmission time of the Cell 1). The UE may learn at least one uplink channel of an uplink subframe i of the Cell 1 at a time point a of a subframe i−4 in a downlink direction of the Cell 1, learn at least one uplink channel of a subframe j in an uplink direction at a time point b of a subframe j−4 in a downlink direction of the Cell 2, and learn at least one uplink channel of a subframe j+1 in the uplink direction at a time point c of a subframe j−3 (j+1−4) in the downlink direction of the Cell 2. It may be seen that the time point b for learning the at least one uplink channel of the subframe j is earlier than the time point a for learning the at least one uplink channel of the subframe i, but the time point c for learning the at least one uplink channel of the subframe j+1 is later than the time point a for learning the at least one uplink channel of the subframe i. Therefore, processing time for the UE to decide uplink channel transmit powers of all uplink channels of the subframe i changes to c−d ((c−d)< (a−d)). That is, a proper transmit power of an uplink channel can be allocated only when the UE shortens the processing time for deciding the uplink channel transmit powers of all the uplink channels of the subframe i. In the present disclosure, the base station sends a PDCCH order that includes a PRACH to the UE in a subframe numbered j+1-k (that is, numbered x-k) in the downlink direction. That is, at a time point e of the subframe j+1-k (the time point e is earlier than the time point b), the UE learns whether uplink channel information of the subframe j+1-k includes the PRACH. In this way, the processing time for the UE to decide the uplink channel transmit powers of all the uplink channels of the subframe i may be greater than or equal to a−d. Among channels, the PRACH is a channel with a highest priority, and therefore, in the present disclosure, before the time point a, it may be determined whether uplink channel information of the subframe j+1 in the uplink direction includes the PRACH. When the uplink channel information of the subframe j+1 in the uplink direction includes the PRACH, the UE reserves a reserved power for a base station or a cell group in which the subframe j+1 is located.

It should be noted that the subframe i mentioned above is a subframe in an uplink direction of the Cell 1, and may be any subframe in the first target subframe numbered i; and the subframe i−4 is a subframe in the downlink direction of the Cell 1. Likewise, the subframe j+1 is a subframe in an uplink direction of the Cell 2, and may be any subframe in the second target subframe numbered x; and the subframe j+1-k is a subframe in the downlink direction of the Cell 1. For ease of description, in the following, the subframe i−4 and the subframe i are subframes corresponding to the Cell 1; and the subframe j−4, the subframe j−3, the subframe j, and the subframe j+1 are subframes corresponding to the Cell 2.

Second, by detecting the physical downlink channel of the subframe numbered x-n, the UE may determine that the uplink channel information of the second target subframe numbered x includes the PRACH, where n is an integer greater than or equal to 5.

One scenario is: Assuming n=5, as shown in FIG. 9(a), when the UE receives an RAR (random access response) over a physical downlink channel in a subframe j+1−5, if the RAR does not carry a response corresponding to a preamble sequence sent by the UE, the UE needs to send a preamble sequence again before the subframe j+1. At this time, in a case in which the subframe j+1 includes a PRACH, the UE may still learn, in a subframe j+1-n, that there is a PRACH transmitted in the subframe j+1, and then determine that the uplink channel information of the subframe j+1 includes the PRACH. It may be seen that the time point e of the subframe j+1−5 in the uplink direction of the Cell 1 is earlier than the time point a of the subframe i−4 in the uplink direction of the Cell 2. That is, the time point at which the UE learns whether the uplink channel information of the subframe j+1 includes the PRACH is earlier than the time point at which the UE learns the at least one uplink channel of the subframe i. Therefore, when considering a transmit power of the uplink channel of the subframe i, the UE may consider reservation of a transmit power of the uplink channel of the subframe j+1, so as to allocate a proper transmit power to a base station or a cell group in which the subframe i is located. In addition, the reserved power that is reserved for the base station or the cell group in which the subframe j+1 is located is also proper.

Third, by detecting the PDCCH, the UE may determine that the uplink channel information of the second target subframe numbered x includes only the SRS channel or includes no channel.

This manner is a preset manner of the UE. As shown in FIG. 9(a), before determining the uplink channel of the subframe j+1 in the uplink direction, the UE sets how the UE allocates a transmit power to the uplink channel of the subframe i in the uplink direction when the uplink channel information of the subframe j+1 in the uplink direction includes only the SRS channel; or how the UE allocates a transmit power to the uplink channel of the subframe i in the uplink direction when the uplink channel information of the subframe j+1 in the uplink direction includes no channel; or how the UE allocates a transmit power to the uplink channel of the subframe i in the uplink direction when the uplink channel information of the subframe j+1 in the uplink direction includes another channel except the SRS channel and the uplink channel of the subframe j+1 in the uplink direction includes only the SRS channel or includes no channel. In this preset manner, before learning the uplink channel information of the subframe j+1 in the uplink direction, the UE may determine, in advance, the reserved power for the uplink channel of the subframe j+1 according to the uplink channel of the preset subframe j+1, so as to decide the transmit power, which is to be allocated to the subframe i, of the uplink channel. When the UE determines that the uplink channel of the subframe j+1 is included in the uplink channel information, which is obtained in the preset manner, of the subframe j+1, the UE at this time has decided the transmit power, which is to be allocated to the subframe i, of the uplink channel in different preset cases. Therefore, it is only necessary to acquire the decided transmit power, which is to be allocated to the subframe i, of the uplink channel. In this way, the transmit power of the uplink channel can be allocated properly without reducing the processing time for the UE to decide the transmit powers of all the uplink channels of the subframe i.

Further, optionally, in step 902, when the uplink channel of the second target subframe numbered x includes the PRACH, the reserved power is determined according to a PRACH predefined transmit power and a guaranteed power, where the PRACH predefined transmit power is a transmit power predefined for the PRACH, and the guaranteed power is a guaranteed power configured, by using RRC signaling, for the base station or the cell group in which the second target subframe numbered x is located.

Further, optionally, in step 902, when the uplink channel of the second target subframe numbered x includes the PRACH, the UE further needs to determine a priority of the PRACH and priorities of all the uplink channels of the first target subframe numbered i; and when the priority of the PRACH is higher than the priorities of all the uplink channels of the first target subframe numbered i, determines the reserved power according to a PRACH predefined transmit power and a guaranteed power.

Optionally, the reserved power may be greater than or equal to the guaranteed power and greater than or equal to the PRACH predefined transmit power. For example, the reserved power=max{the guaranteed power, the PRACH predefined transmit power}.

The PRACH predefined transmit power may be:

min{$P_{CMAX,c}(j)$, PREAMBLE_RECEIVED_TARGET_POWER+$PL_c$}, where $P_{CMAX,c}(j)$ is a maximum transmit power of a subframe numbered j of a cell c in which the PRACH of the second target subframe numbered x is located, the preamble received target power PREAMBLE_RECEIVED_TARGET_POWER is a power parameter configured by a higher layer, $PL_c$ is a measurement value of a path loss of the UE, and the path loss may be obtained by the UE by measuring a reference signal of the cell c or another reference cell, where j=x−1, the subframe numbered j is a subframe previous to the subframe numbered x, and when x−1 is out of a range 0~9, the number of the subframe numbered j is (x−1)mod 10, where mod is a modulo operator.

Alternatively, the PRACH predefined transmit power may be:

PREAMBLE_RECEIVED_TARGET_POWER+$PL_c$.

Further, optionally, in step 902, when there is no PDCCH used to indicate the another channel, except the SRS channel, of the uplink channel of the second target subframe numbered x, the second target subframe numbered x has no uplink channel or has only the SRS channel, and the uplink channel of the first target subframe numbered i includes at least one non-SRS channel, it is determined that the reserved power is 0.

It should be noted that the reserved power 0 reserved by the UE herein for the base station or the cell group in which the second target subframe numbered x is located may indicate that the UE reserves no power for the base station or the cell group in which the second target subframe numbered x is located. That is, when a transmit power of an uplink channel of a base station or a cell group in which the first target subframe numbered i is located is less than the maximum transmit power of the UE, if the UE needs to send data over the SRS channel in the second target subframe numbered x, an actual transmit power of the uplink channel of the base station or the cell group in which the second target subframe numbered x is located is the maximum transmit power of the UE minus the transmit power of the uplink channel of the base station or the cell group in which the first target subframe numbered i is located; and when the transmit power of the uplink channel of the base station or the cell group in which the first target subframe numbered i is located is equal to the maximum transmit power of the UE, the UE gives up transmission over the SRS channel in the second target subframe numbered x.

Further, optionally, step 903 may further include:

when the sum of the transmit powers of all the uplink channels in the at least one uplink channel of the first target subframe numbered i and the reserved power is greater than the maximum transmit power of the UE, compressing, by the UE, at least one transmit power of the at least one uplink channel of the first target subframe numbered i, so that the sum of the transmit powers of all the uplink channels in the at least one uplink channel of the first target subframe numbered i and the reserved power is less than or equal to the maximum transmit power of the UE.

Further, optionally, after step 903, the UE sends, according to the transmit power, a signal on the at least one uplink channel of the first target subframe numbered i.

According to the power allocation method provided in this embodiment of the present disclosure, before UE determines a transmit power of an uplink channel of a first target subframe numbered i, when the UE determines that there is a special case of an uplink channel of a second target subframe numbered x that uplink channel information of the second target subframe numbered x includes a PRACH or includes only an SRS channel or includes no channel or the like, a reserved power that is reserved for a base station or a cell group in which the second target subframe numbered x is located is more proper, and a decided transmit power of each uplink channel of the first target subframe numbered i is also proper, thereby resolving a problem of low receiving performance of an uplink channel of the UE in a base station of a cell in which the UE is located.

Figure 10:
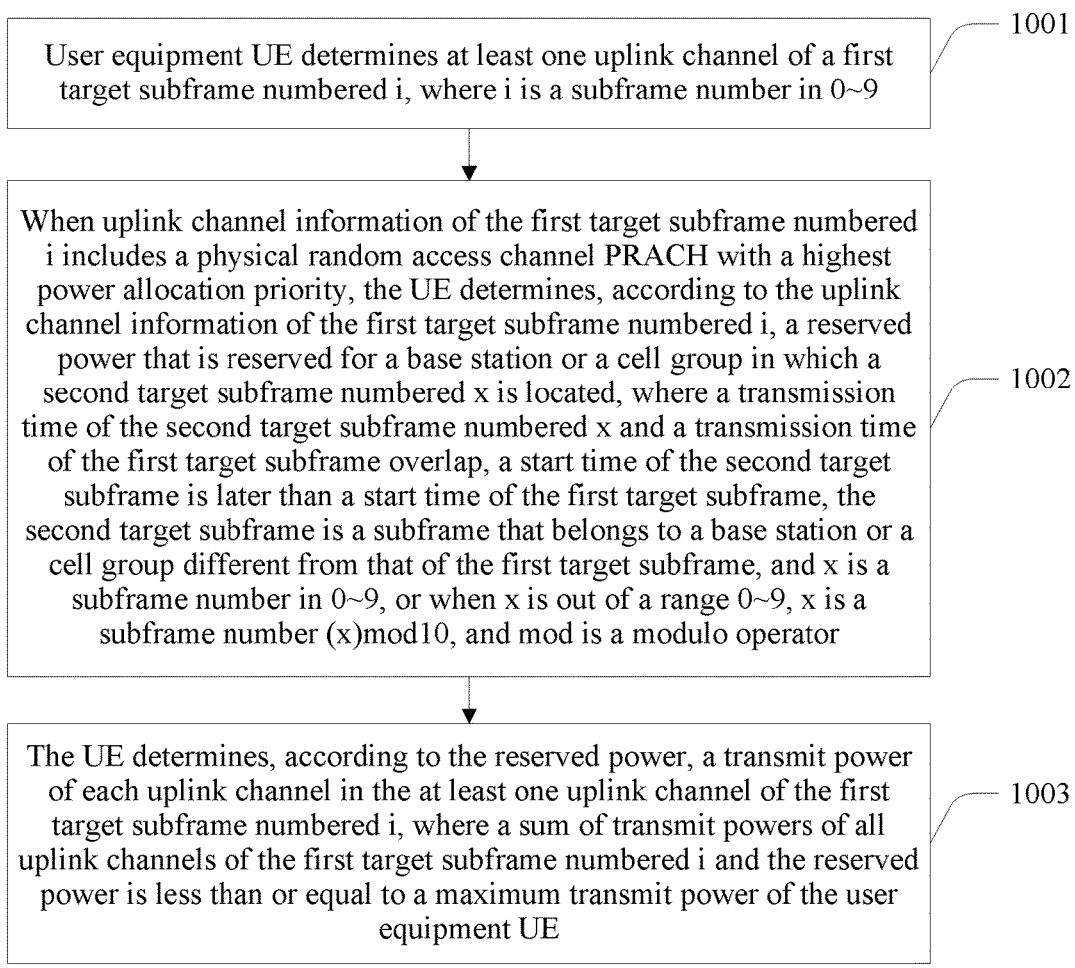
FIG. 10 is a flowchart of another power allocation method according to an embodiment of the present disclosure.

With reference to the description in FIG. 3 to FIG. 8, the present disclosure provides another power allocation method. As shown in FIG. 10, the method specifically includes:

1001. UE determines at least one uplink channel of a first target subframe numbered i, where i is a subframe number in 0~9.

1002. When uplink channel information of the first target subframe numbered i includes a PRACH with a highest power allocation priority, the UE determines, according to the uplink channel information of the first target subframe numbered i, a reserved power that is reserved for a base station or a cell group in which a second target subframe numbered x is located, where a transmission time of the second target subframe numbered x and a transmission time of the first target subframe overlap, a start time of the second target subframe is later than a start time of the first target subframe, the second target subframe is a subframe that belongs to a base station or a cell group different from that of the first target subframe, and x is a subframe number in 0~9, or when x is out of a range 0~9, x is a subframe number (x)mod 10, and mod is a modulo operator.

1003. The UE determines, according to the reserved power, a transmit power of each uplink channel in the at least one uplink channel of the first target subframe numbered i, where a sum of transmit powers of all uplink channels of the first target subframe numbered i and the reserved power is less than or equal to a maximum transmit power of the UE.

The power allocation method provided in the embodiment of the present disclosure can achieve a purpose of properly allocating a transmit power of an uplink channel.

Further, in step 1001, a manner in which the UE determines the at least one uplink channel of the first target subframe numbered i is the same as the manner in which the UE shown in FIG. 9 determines the at least one uplink channel of the first target subframe numbered i, and reference may be made to the related description shown in FIG. 9; details are not described herein again.

Further, in step 1002, according to a PRACH transmit power and a guaranteed power, the UE determines the reserved power that is reserved for the base station or the cell group in which the second target subframe numbered x is located. The PRACH transmit power is a transmit power of the PRACH of the first target subframe numbered i, the guaranteed power is a guaranteed power configured, by using RRC signaling, for the base station or the cell group in which the second target subframe numbered x is located, and the reserved power is less than or equal to the guaranteed power and less than or equal to a difference between the maximum transmit power $P_{CMAX}$ of the UE and the PRACH transmit power. For example, the reserved power=max{the guaranteed power, $P_{CMAX}$–the PRACH transmit power}. $P_{CMAX}$ is the maximum transmit power of the UE, where the maximum transmit power may have different values at different times. For example, in a different subframe overlap time, an uplink channel of each cell at different times may be different, and a maximum power back-off differs. Therefore, $P_{CMAX}$ used at a time of determining the reserved power is not a maximum transmit power of the UE at a time of transmission of the uplink channel of the second target subframe numbered x, but is the maximum transmit power of the UE that is determined before that time. The determined reserved power is not an actual transmit power of the second target subframe numbered x. The actual transmit power needs to be adjusted according to $P_{CMAX}$ of the second target subframe numbered x. The transmit power of the uplink channel of the first target subframe numbered i has been determined, and does not change within one subframe. Therefore, when $P_{CMAX}$ in an overlap area between a subframe numbered i and a subframe numbered x decreases, only a transmit power of an uplink channel of the subframe numbered x can be adjusted.

Optionally, the PRACH transmit power may be:

$\min\{P_{CMAX,c}(i), \text{PREAMBLE\_RECEIVED\_TARGET\_POWER}+PL_c\}$, where $P_{CMAX,c}(i)$ is a maximum transmit power of a subframe i of a cell c in which the PRACH of the first target subframe numbered i is located, PREAMBLE_RECEIVED_TARGET_POWER is a power parameter configured by a higher layer, $PL_c$ is a measurement value of a path loss of the UE, and the path loss may be obtained by the UE by measuring a reference signal of the cell c or another reference cell.

Further, optionally, step 1003 may further include:

when the sum of the transmit powers of all the uplink channels in the at least one uplink channel of the first target subframe numbered i and the reserved power is greater than the maximum transmit power of the UE, compressing, by the UE, at least one transmit power of the at least one uplink channel of the first target subframe numbered i, so that the sum of the transmit powers of all the uplink channels in the at least one uplink channel of the first target subframe numbered i and the reserved power is less than or equal to the maximum transmit power of the UE.

Further, after step 1003, the UE sends, according to the transmit power, a signal on the at least one uplink channel of the first target subframe numbered i.

It should be noted that the reserved power, which is reserved for the base station or the cell group in which the second target subframe numbered x is located, is determined by the UE by referring to the uplink channel information of the first target subframe numbered i, which is a difference from the method described in FIG. 9. That is because, when the UE detects that the uplink channel of the first target subframe numbered i includes the PRACH with the highest power allocation priority, it indicates that the UE needs to preferentially consider the transmit power of the uplink channel of the PRACH of the first target subframe numbered i. The reserved power is less than or equal to the guaranteed power and less than or equal to the difference between the maximum transmit power of the UE and the PRACH transmit power. In this way, a purpose of properly allocating a transmit power of an uplink channel is achieved, and a problem of low receiving performance of an uplink channel of the UE in a base station of a cell in which the UE is located is resolved.

According to the power allocation method provided in this embodiment of the present disclosure, UE uses uplink channel information to improve a reserved power in a special case of an uplink channel of a subframe numbered x, thereby improving receiving performance of a base station.

It may be clearly understood by a person skilled in the art that, for the purpose of convenient and brief description, division of the foregoing function modules is used as an example for illustration. In an actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal device, comprising:
   a memory, configured to store information that comprises program instructions; and
   a processor, coupled to the memory and configured to control execution of the program instructions, to configure the terminal device to:
   determine at least one uplink channel of a first target subframe numbered i, wherein i is a subframe number in 0 to 9;
   determine, according to a physical random access channel (PRACH) predefined transmit power and a guaranteed power, a reserved power that is reserved for a base station or a cell group in which a second target subframe numbered x is located,
   wherein the reserved power is determined when an uplink channel of the second target subframe numbered x comprises a PRACH indicated by a physical downlink control channel order (PDCCH) order, wherein the PDCCH order is in a subframe numbered x-k, wherein k is an integer greater than or equal to 6 wherein a transmission time of the second target subframe numbered x and a transmission time of the first target subframe overlap, a start time of the second target subframe is later than a start time of the first target subframe, the second target subframe is a subframe that belongs to a base station or a cell group different from a base station or a cell group of the first target subframe, and x is a subframe number in range of 0 to 9, or
   the reserved power is determined when an uplink channel of the second target subframe numbered x comprises a PRACH determined by using a physical downlink channel of a subframe numbered x-n, wherein n is an integer greater than or equal to 5; and
   wherein the PRACH predefined transmit power is a transmit power predefined for the PRACH, and the guaranteed power is a guaranteed power configured by using higher layer signaling for the base station or the cell group in which the second target subframe numbered x is located; and
   determine, according to the reserved power, a transmit power of each uplink channel in the at least one uplink channel of the first target subframe numbered i, wherein a sum of transmit powers of all uplink channels of the first target subframe numbered i and the reserved power is less than or equal to a maximum transmit power of the terminal device.

2. The terminal device according to claim 1, wherein the processor is further configured to:

when the sum of the transmit powers of all the uplink channels in the at least one uplink channel of the first target subframe numbered i and the reserved power is greater than the maximum transmit power of the terminal device, compress at least one transmit power of the at least one uplink channel of the first target subframe numbered i.

3. The terminal device according to claim 1, further comprising:
a transceiver, configured to send, according to the transmit power, a signal on the at least one uplink channel of the first target subframe numbered i.

4. The terminal device according to claim 3, wherein:
the transceiver is further configured to receive the physical downlink channel of the subframe numbered x-n, and provide the processor with the physical downlink channel of the subframe numbered x-n; and
the processor is further configured to, by detecting the physical downlink channel of the subframe numbered x-n, determine that the uplink channel information of the second target subframe numbered x comprises the PRACH.

5. The terminal device according to claim 1, wherein the processor is further configured to:
when the uplink channel of the second target subframe numbered x comprises the PRACH, determine a priority of the PRACH and priorities of all the uplink channels of the first target subframe numbered i; and
when the priority of the PRACH is higher than the priorities of all the uplink channels of the first target subframe numbered i, determine the reserved power according to the PRACH predefined transmit power and the guaranteed power.

6. The terminal device according to claim 1, wherein the processor is configured to determine that a value of the reserved power is greater than or equal to max{the guaranteed power, the PRACH predefined transmit power}, wherein max corresponds to taking a maximum value.

7. The terminal device according to claim 1, wherein the PRACH predefined transmit power is:
min{$P_{CMAx,c}(j)$, PREAMBLE_RECEIVED_TARGET_POWER+PLc}, wherein $P_{CMAX,c}(j)$ is a maximum transmit power of a subframe numbered j of a cell c in which the PRACH of the second target subframe numbered x is located, the PREAMBLE RECEIVED TARGET POWER is a power parameter configured by a higher layer, PLc is a measurement value of a path loss of the terminal device, j=x−1, the subframe numbered j is a subframe previous to the subframe numbered x, and when x−1 is out of a range 0-9, the number of the subframe numbered j is (x−1)mod 10, wherein mod is a modulo operator.

8. The terminal device according to claim 1, wherein the PRACH predefined transmit power is:
PREAMBLE_RECEIVED_ TARGET_ POWER+PLc, wherein the PREAMBLE_ RECEIVED_TARGET_POWER is a power parameter configured by a higher layer, and PLc is a measurement value of a path loss of the terminal device.

9. A power allocation method, comprising:
determining, by terminal device, at least one uplink channel of a first target subframe numbered i, wherein i is a subframe number in range of 0 to 9;
determining, by the terminal device according to a physical downlink control channel order (PDCCH) predefined transmit power and a guaranteed power, a reserved power that is reserved for a base station or a cell group in which a second target subframe numbered x is located,
wherein the reserved power is determined when an uplink channel of the second target subframe numbered x comprises a PRACH indicated by a physical downlink control channel order (PDCCH) order, wherein the PDCCH order is in a subframe numbered x-k, wherein k is an integer greater than or equal to 6, wherein a transmission time of the second target subframe numbered x and a transmission time of the first target subframe overlap, a start time of the second target subframe is later than a start time of the first target subframe, the second target subframe is a subframe that belongs to a base station or a cell group different from a base station or a cell group of the first target subframe, and x is a subframe number in range of 0 to 9; or
wherein the reserved power is determined when an uplink channel of the second target subframe numbered x comprises a PRACH determined by using a physical downlink channel of a subframe numbered x-n, wherein n is an integer greater than or equal to 5; and
wherein the PRACH predefined transmit power is a transmit power predefined for the PRACH, and the guaranteed power is a guaranteed power configured by using higher layer signaling for the base station or the cell group in which the second target subframe numbered x is located; and
determining, by the terminal device according to the reserved power, a transmit power of each uplink channel in the at least one uplink channel of the first target subframe numbered i, wherein a sum of transmit powers of all uplink channels of the first target subframe numbered i and the reserved power is less than or equal to a maximum transmit power of the terminal device.

10. The power allocation method according to claim 9, wherein the determining, by the terminal device according to the reserved power, the transmit power of each uplink channel in the at least one uplink channel of the first target subframe numbered i comprises:
when the sum of the transmit powers of all the uplink channels in the at least one uplink channel of the first target subframe numbered i and the reserved power is greater than the maximum transmit power of the terminal device, compressing, by the terminal device, at least one transmit power of the at least one uplink channel of the first target subframe numbered i, so that the sum of the transmit powers of all the uplink channels in the at least one uplink channel of the first target subframe numbered i and the reserved power is less than or equal to the maximum transmit power of the terminal device.

11. The power allocation method according to claim 10, wherein the method further comprises:
determining, by the terminal device by detecting the physical downlink channel of the subframe numbered x-n, that the uplink channel information of the second target subframe numbered x comprises the PRACH.

12. The power allocation method according to claim 9, wherein the method further comprises:
sending, by the terminal device according to the transmit power, a signal on the at least one uplink channel of the first target subframe numbered i.

13. The power allocation method according to claim 9, wherein the determining, by the terminal device according to the uplink channel information of the second target subframe numbered x, the reserved power that is reserved for the base station or the cell group in which the second target subframe numbered x is located comprises:
  when the uplink channel of the second target subframe numbered x comprises the PRACH, determining, by the terminal device, a priority of the PRACH and priorities of all the uplink channels of the first target subframe numbered i; and
  determining, by the terminal device, the reserved power according to the PRACH predefined transmit power and the guaranteed power when the priority of the PRACH is higher than the priorities of all the uplink channels of the first target subframe numbered i.

14. The power allocation method according to claim 9, wherein the determining, by the terminal device, the reserved power according to the PRACH predefined transmit power and the guaranteed power comprises:
  determining, by the terminal device, that a value of the reserved power is greater than or equal to max{the guaranteed power, the PRACH predefined transmit power}, wherein max corresponds to taking a maximum value.

15. The power allocation method according to claim 9, wherein the PRACH predefined transmit power is:
  $\min\{P_{CMAX,c}(j)$, PREAMBLE_RECEIVED_TARGET_POWER+PLc$\}$, wherein $P_{CMAX,c}(j)$ is a maximum transmit power of a subframe numbered j of a cell c in which the PRACH of the second target subframe numbered x is located, the PREAMBLE_RECEIVED_TARGET_POWER is a power parameter configured by a higher layer, PLc is a measurement value of a path loss of the terminal device, j=x−1, the subframe numbered j is a subframe previous to the subframe numbered x, and when x−1 is out of a range 0-9, the number of the subframe numbered j is (x−1)mod 10, wherein mod is a modulo operator.

16. The power allocation method according to claim 9, wherein the PRACH predefined transmit power is:
  PREAMBLE_ RECEIVED_ TARGET_ POWER+PLc, wherein the PREAMBLE_ RECEIVED_TARGET_ POWER is a power parameter configured by a higher layer, and PLc is a measurement value of a path loss of the terminal device.

17. A non-transitory computer readable storage medium that stores a program, wherein when the program is executed by a processor, the following steps are performed:
  determining at least one uplink channel of a first target subframe numbered i, wherein i is a subframe number in range of 0 to 9;
  determining according to a physical downlink control channel order (PDCCH) predefined transmit power and a guaranteed power, a reserved power that is reserved for a base station or a cell group in which a second target subframe numbered x is located,
  wherein the reserved power is determined when an uplink channel of the second target subframe numbered x comprises a PRACH indicated by a physical downlink control channel order (PDCCH) order, wherein the PDCCH order is in a subframe numbered x-k, wherein k is an integer greater than or equal to 6, wherein a transmission time of the second target subframe numbered x and a transmission time of the first target subframe overlap, a start time of the second target subframe is later than a start time of the first target subframe, the second target subframe is a subframe that belongs to a base station or a cell group different from a base station or a cell group of the first target subframe, and x is a subframe number in range of 0 to 9; or
  wherein the reserved power is determined when an uplink channel of the second target subframe numbered x comprises a PRACH determined by using a physical downlink channel of a subframe numbered x-n, wherein n is an integer greater than or equal to 5; and
  wherein the PRACH predefined transmit power is a transmit power predefined for the PRACH, and the guaranteed power is a guaranteed power configured by using higher layer signaling for the base station or the cell group in which the second target subframe numbered x is located; and
  determining according to the reserved power, a transmit power of each uplink channel in the at least one uplink channel of the first target subframe numbered i, wherein a sum of transmit powers of all uplink channels of the first target subframe numbered i and the reserved power is less than or equal to a maximum transmit power of a terminal device.

18. The non-transitory computer readable storage medium according to claim 17, wherein the steps further comprise:
  sending according to the transmit power, a signal on the at least one uplink channel of the first target subframe numbered i.

19. The non-transitory computer readable storage medium according to claim 17, wherein the steps further comprise:
  determining by detecting the physical downlink channel of the subframe numbered x-n, that the uplink channel information of the second target subframe numbered x comprises the PRACH.

20. The non-transitory computer readable storage medium according to claim 17, wherein the determining the reserved power according to the PRACH predefined transmit power and the guaranteed power comprises:
  determining that a value of the reserved power is greater than or equal to max{the guaranteed power, the PRACH predefined transmit power}, wherein max corresponds to taking a maximum value.

* * * * *